UNITED STATES PATENT OFFICE.

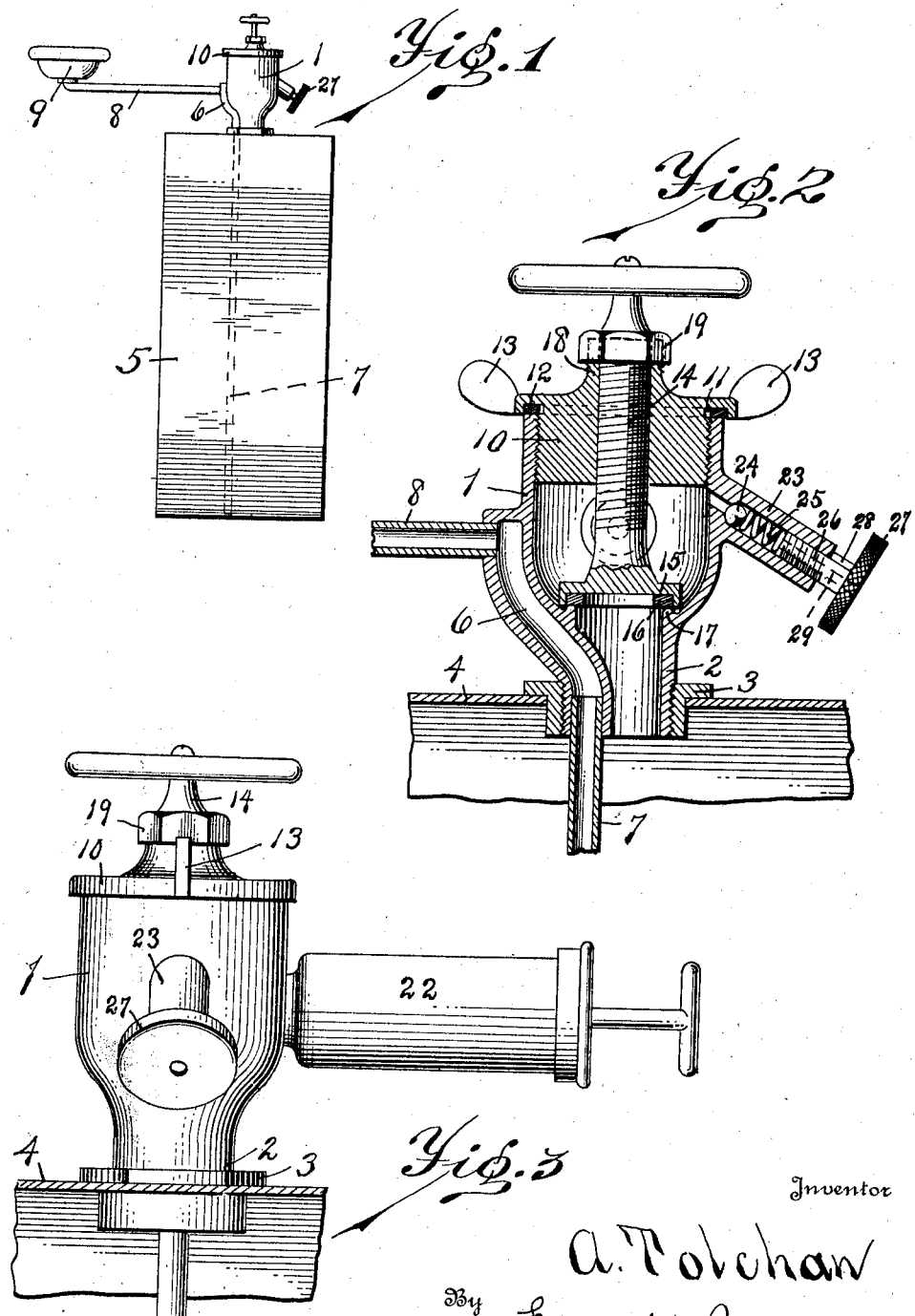

ALEXANDER TOLCHAN, OF DETROIT, MICHIGAN.

FILLER-VALVE.

1,361,418.  Specification of Letters Patent.  Patented Dec. 7, 1920.

Application filed March 10, 1920. Serial No. 364,699.

*To all whom it may concern:*

Be it known that I, ALEXANDER TOLCHAN, a citizen of the United States, and residing at Detroit, in the county of Wayne and State of Michigan, have invented a new and Improved Filler-Valve, of which the following is a specification.

This invention relates to pressure tanks for liquid fuel burners, and its object is to provide a valve for filling the tank, charging it with proper pressure and discharging the tank, which will obviate the necessity of more than one opening into the fuel tank.

This invention consists in a valve body generally of funnel shape which is adapted to be connected at its lower end to a fuel tank and which is provided with a cap, a valve stem rotatably mounted in said cap, a valve at the lower end of the valve stem adapted to close the passage to the tank, an operating handle at the upper end of the valve stem, a pump connected to said valve body whereby air may be forced into said fuel tank, and a combined safety valve and relief valve connected to said valve body.

This invention further consists in the details of construction illustrated in the accompanying drawings and particularly pointed out in the claims.

In the accompanying drawing, Figure 1 is an elevation of a fuel tank, a burner and this improved filler valve connecting the two. Fig. 2 is a vertical section of the filler valve in a plane parallel to that of Fig. 1. Fig. 3 is an elevation of this filler valve and the pump connected thereto seen from the right in Fig. 2.

Similar reference characters refer to like parts throughout the several views.

In supply tanks from which liquid fuel is forced to burners by air pressure it is customary to have separate openings into which the air pump, the discharge pipe and the filler plug are connected. To these openings is sometimes added a fourth for a safety valve. There is always danger of leakage at each opening and the present invention is designed to reduce this danger of leakage as well as save the cost of providing proper bushings at these openings by reducing the number thereof to a minimum. It is further designed to provide a single unitary structure which will accomplish all of the results heretofore accomplished by these several attachments and to accomplish them in a more satisfactory manner.

The filler valve comprises a funnel shaped body 1 which is provided at its lower end with a threaded nipple 2 which screws into a bushing 3 secured in any desired manner to the head 4 of the fuel tank 5. Formed as a part of this filler valve is a conduit 6 into whose lower end is secured a pipe 7 which extends to the bottom of the fuel tank and into whose upper end is secured a pipe 8 that leads to the burner 9. As the opening into which the pipe 7 is connected is entirely within the threaded end of the valve body, a single bushing 3 is all that is necessary to be attached to this fuel tank.

Screwed into the upper end of the valve body 1 is a filler cap 10 which is provided with a groove 11 to receive a packing ring 12 whereby the joint between the filler cap and the valve body is sealed. I prefer to form wings 13 on this cap in order that it may be screwed in and out without difficulty. This cap is centrally threaded for the valve stem 14 which has a valve 15 at its lower end provided with a recess to receive the packing ring 16 which is forced onto the seat 17 by this threaded stem 14. In order to prevent leakage around this stem, a hub 18 is formed on this cap and is threaded to receive the packing nut 19 of well known construction, the details of which are omitted.

An air pump 22 is connected into the side of this filler valve and is adapted to force air into the tank 5 when the valve 15 is moved from its seat. Connected to the body 1 is a safety valve consisting of a casing 23, a ball valve 24, a spring 25, and a threaded stem 26 having a wheel 27 at its outer end and being provided with a stop 28. This stem is provided with a central passage 29 shown in dotted lines. When this stem 26 is screwed into the casing 23 until the stop 28 engages the end therof, it will require a predetermined pressure to move the valve 24 from its seat. This spring and stem limit the pressure which may possibly be obtained in the tank 5 and thus insure against excess of pressure.

When it is desired to fill the tank, the valve 15 is moved from its seat and the stem 26 screwed back to permit any pressure in the tank to escape through the safety valve and through the passage 29 in the stem 26. The cap 10 is then removed and the desired amount of fuel is poured into the tank 5, after which the cap is screwed back into place and the stem 26 of the safety valve is screwed up until the stop 28 contacts with the body 23.

When the burner 9 is to be lighted, the air pump 22 is operated until a sufficient pressure is obtained in the tank, which is indicated by the escape of air through the safety valve. The stem 14 and valve 15 are then screwed down tightly, which seals the opening at the valve seat 17. This air pressure forces fuel up to the burner 9 where it is ignited. When it is desired to extinguish the flame at the burner 9, the stem 26 is turned back so as to permit the valve 24 to leave its seat and the stem 14 is screwed up to lift the valve 15 from its seat, which results in the air in the tank rushing out until the pressure is down to that of the atmosphere, which will permit the fuel in the pipe 8 to drain back into the tank and permit the flame to extinguish. The safety valve insures against an excess of pressure in the tank. Screwing down the valve 15 prevents any evaporation of fuel through the valve and any leakage of pressure should the ball 24 fail to seat properly. The parts are all very simple and can be finished by means of ordinary shop tools. Owing to the few steps necessary to machine these parts, the cost of this device may be kept very low.

It will be noticed that the casing 23 of the safety valve is inclined downwardly and that the ball 24 will, when released, move away from its seat. This insures complete relief of pressure. If this casing were inclined upwardly, the weight of the ball valve and its spring 25 would be sufficient to hold the valve on its seat and trap sufficient pressure in the filler valve and tank to force fuel through the pipes 7 and 8 to the burner to cause very objectionable wastage of the fuel. This is particularly true when the tank is nearly full of fuel.

The sizes and proportions of the various parts shown in the drawing and described may all be changed by those skilled in the art without departing from the spirit of my invention as set forth in the following claims.

I claim:—

1. A filler valve for pressure tanks comprising a funnel shaped valve body having a discharge opening and a valve to close the opening, said valve having a discharge conduit for the tanks in its wall independent of said discharge opening in the valve, a pipe extending down into the tank from said conduit, and a safety valve connected to said valve body to relieve excess pressure in the tank.

2. A filler valve for pressure tanks comprising a funnel shaped valve body having a discharge opening and a valve to close the opening, said valve having a discharge conduit for the tanks in its wall independent of said discharge opening in the valve, a pipe extending down into the tank from said conduit, a safety valve connected to said valve body, and an air pump connected to said valve body.

3. A filler valve for pressure tanks comprising a funnel shaped valve body having a discharge passage in its lower end and a valve seat surrounding the passage, a cap for the valve body, a valve stem screw-threaded in said cap and a valve at the lower end of the stem adapted to engage said seat, a safety valve casing connecting to said valve body, a ball valve in said casing and a spring to hold the valve on its seat, and a hollow adjustable stem screw-threaded in said casing to engage the spring and provided with a stop to limit the pressure on said spring and valve, said stem being adapted to turn back to free the valve.

4. A filler valve for pressure tanks comprising a funnel shaped valve body having a discharge passage in its lower end and a valve seat surrounding the passage, a cap for the valve body, a valve stem screw-threaded in said cap and a valve at the lower end of the stem adapted to engage said seat, a safety valve casing connecting to said valve body, a ball valve in said casing and a spring to hold the valve on its seat, a hollow adjustable stem screw-threaded in said casing to engage the spring and provided with a stop to limit the pressure on said spring and valve, said stem being adapted to turn back to free the ball valve, and an air pump connected to the valve body to create pressure in the tanks, said pressure being limited by the safety valve.

5. A filler valve for pressure tanks comprising a funnel shaped valve body having a discharge passage in its lower end and a valve seat surrounding the passage, a cap for the valve body, a valve stem screw-threaded in said cap and a valve at the lower end of the stem adapted to engage said seat, a safety valve casing connecting to said valve body, a ball valve in said casing and a spring to hold the valve on its seat, a hollow adjustable stem screw-threaded in said casing to engage the spring and provided with a stop to limit the pressure on said spring and valve, said stem being adapted to turn back to free the ball valve, an air pump connected to the valve body to create pressure in the tanks, said pressure being limited by the safety valve, a discharge conduit extending into the discharge passage of the valve body below the valve seat, a pipe connecting into the lower end of the conduit and extending downward, and a second pipe connecting into the upper end of the conduit and extending to a burner.

ALEXANDER TOLCHAN.